United States Patent [19]

Kriegel et al.

[11] 4,215,101

[45] Jul. 29, 1980

[54] METHOD AND APPARATUS FOR PERFORMING CHEMICAL AND/OR PHYSICAL TREATMENTS

[75] Inventors: Ernst Kriegel; Dietrich Radke, both of Essen; Hans Klein; Carlos Arbeletche, both of Beckum, all of Fed. Rep. of Germany

[73] Assignee: Fried. Krupp Gesellschaft mit beschrankter Haftung, Essen, Fed. Rep. of Germany

[21] Appl. No.: 915,225

[22] Filed: Jun. 13, 1978

[51] Int. Cl.² ............................................. B01D 53/34
[52] U.S. Cl. ........................... 423/659; 423/210; 423/240; 423/239; 423/244; 55/74; 55/79; 55/262; 55/390; 55/474; 75/26; 48/197 R; 422/145; 422/147; 422/171; 422/177; 422/190
[58] Field of Search .......... 423/210, 230, 659, 231, 423/239, 175, 240, 244 S, DIG. 16; 55/74, 77, 78, 73, 79, 99, 71, 262, 390, 474; 422/145, 147, 171, 177, 190; 48/197 R; 75/26

[56] References Cited

U.S. PATENT DOCUMENTS

| | | | |
|---|---|---|---|
| 1,825,707 | 10/1931 | Wagner, Jr. | 55/79 |
| 3,940,237 | 2/1976 | Gonzalez et al. | 55/99 |
| 3,952,022 | 4/1976 | Becuwe | 422/145 |
| 4,065,271 | 12/1977 | Weckesser et al. | 55/71 |

*Primary Examiner*—Earl C. Thomas
*Attorney, Agent, or Firm*—Spencer & Kaye

[57] ABSTRACT

A method of performing a treatment of a dust cloud includes the successive steps of generating the dust cloud from a gas and from solid particles, passing the dust cloud through a reaction zone, separating the dust cloud into its components in a separator, and reintroducing at least one part of at least one component into the dust cloud. There is further formed a solids column into which fresh or recirculated solid particles are introduced. The solids column which seals the gas used for generating the dust cloud from the separator, is height-adjustable for controlling the concentration of solids in the dust cloud formed from the solid particles constituting the solids column.

19 Claims, 1 Drawing Figure

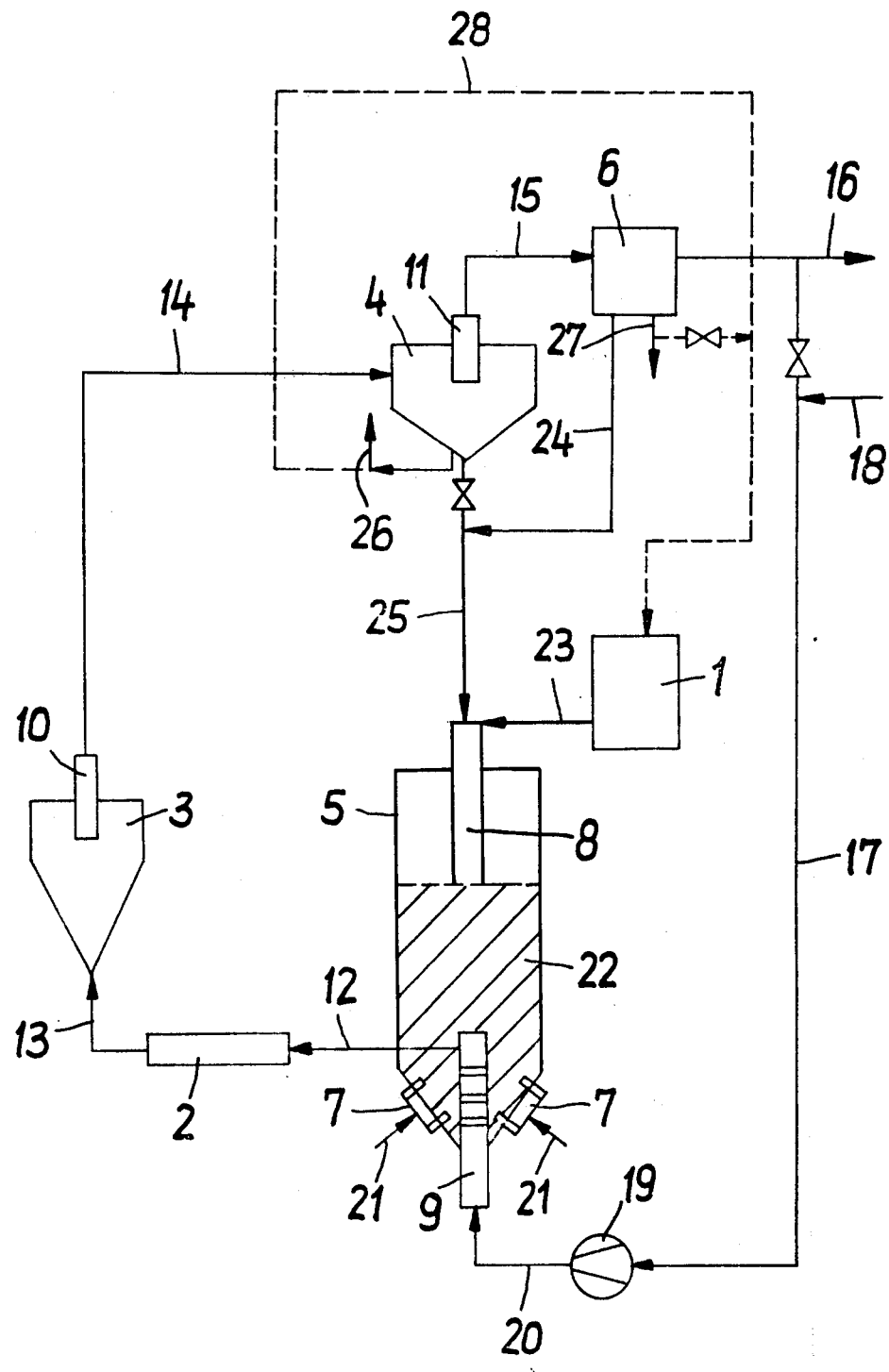

METHOD AND APPARATUS FOR PERFORMING CHEMICAL AND/OR PHYSICAL TREATMENTS

BACKGROUND OF THE INVENTION

This invention relates to a method and apparatus for chemically and/or physically treating a dust cloud. The method involves generating a dust cloud from a gas and solid particles, passing the dust cloud through a reaction zone and subsequently separating the components and at least partially reintroducing the gas and/or the solid particles into the dust cloud.

It is known that chemical and/or physical processes, particularly thermal treatments may be performed on matter forming a dust cloud which is formed of a gas containing one or several gaseous materials and solid particles formed of one or several solid substances. The dust cloud is in motion and passes through a reaction zone in which, for example, chemical reactions, heat exchange processes, adsorption processes, or classification of solids take place. The gas always serves as the carrier means for the solid particles; it may, nevertheless, participate in the treatment to which the dust cloud is submitted. After the dust cloud has passed through the reaction zone by means of appropriate apparatuses such as dust removing chambers or cyclones, it is separated to its components. Gas and solid particles leave, along different paths, the apparatuses which serve for the separation of the dust cloud, and are, dependent upon the type and course of the treatment, further utilized, or are disposed of in part as non-usuable reaction products or are reintroduced into the dust cloud. As a rule, the process does not evolve quantitatively during a single passage of the dust cloud through the reaction zone; thus, at least a partial recirculation of the gas and/or the solid particles is necessary. The dust cloud is generated by mixing a gas stream with solid particles of appropriate grain size. In a dust cloud the gas and all solid particles move continuously with an approximately identical speed from location A to location B, while in a layer of turbulence a large part of the solid particles is in a location-bound motion (floating state) and thus only the gas and some of the solid particles reach location B from location A.

It is further known to remove the solid particles (after the separation of the dust cloud) from the separators by means of oscillating flaps, augers, compartmented wheel gates or the like in a mechanical manner and to occasionally reintroduce them into the dust cloud. All these conveying devices have, however, the disadvantage that they include movable components exposed to wear which increases the likelihood of breakdown and involves elevated energy and maintenance costs.

SUMMARY OF THE INVENTION

It is an object of the invention to provide an improved method and apparatus which chemically and/or physically treats a dust cloud in a secure and economical manner while ensuring a permanent concentration of solids in the dust cloud, further which can be reliably controlled and which can be adapted by simple means to different chemical and physical processes.

This object and others to become apparent as the specification progresses, are accomplished by the invention, according to which, briefly stated, the method of performing a treatment of a dust cloud includes the successive steps of generating the dust cloud from a gas and from solid particles, passing the dust cloud through a reaction zone, separating the dust cloud into its components in a separator, and reintroducing at least one part of at least one component into the dust cloud. There is further formed a solids column into which fresh or recirculated solid particles are introduced. The solids column which seals the gas used for generating the dust cloud from the separator, is height-adjustable for controlling the concentration of solids in the dust cloud formed from the solid particles constituting the solids column.

It was unexpectedly found that the solid particles separated in the separator may be removed by free fall into a column of loose material (hereafter referred to as solids column) which is contained in an appropriate vessel and the height of which may be adjusted by means i.e. of the height-adjustable immersion tube according to the measured height of the solid column. The solids column thus controls the solid particle content of the dust cloud and seals the separator. In case the flow resistance of the solids column is so set by the appropriate selection of a predetermined height of the solids column that it is greater than the sum of the flow resistances encountered in the reaction zone, the separator and the additional devices present in the system, no gas can enter directly from the solids column into the separator and the dust cloud flows into the reaction zone. In case the height of the solids column is further increased, the solid particle concentration in the dust cloud increases. Further, the method according to the invention may be adapted to various process conditions by changing the height of the solids column. By virtue of the invention the selected treatment can be administered in a more secure, more uniform and more economical manner, particularly in case the process involves treatments at high temperatures. The method according to the invention may be performed either under suction or pressure conditions and may further be performed in several subsequent stages.

In accordance with a further feature of the invention, the separated solid particles are reintroduced into the dust cloud repeatedly until the chemical and/or physical process between solid substance and gas is terminated. This measure has the advantage that the solid substance and the gas may interact until a boundary condition regarding the reaction capabilities is reached.

The invention further provides an apparatus for performing the above-outlined process. The apparatus according to the invention has a reaction tube, to which there is connected a downstream-arranged separator and a vessel adapted to receive the solids column. The vessel has, at its lower portion, at least one driving nozzle and further has, at its upper portion, an immersion tube which communicates with a storage container and which is height-adjustable. This apparatus, which is a combination of known individual components, has no parts that are mechanically moved during operation.

In accordance with a further feature of the invention, between the reaction tube and the separator there is arranged at least one reaction chamber and further, the separator is formed of at least one cyclone. It is advantageous in this arrangement to provide the reaction chamber or reaction chambers and/or the cyclone or cylones with height-adjustable immersion tubes. In this manner, additional control of the process is possible. In the reaction chambers a setting of the local solid particle concentration is possible independently from the throughput and thus a desired high concentration can be achieved. The control range is approximately between 0.001 and 60% volume—preferably between 0.1 and 20% volume—of solid particles in the gas. By using at least one reaction chamber in addition to the reaction tube there is achieved a longer dwelling period for the dust cloud in the reaction zone; this in many cases may result in reducing the work involved in the recirculation.

In performing processes that require high operational temperatures it is advantageous according to the invention to provide all structural components of the apparatus with fire-resistant cladding. For such cladding, dependent upon temperature and properties of the solid substance, for example, the following materials may be considered: refractory bricks or compressed refractory masses, as well as fire-resistant materials based on silicic acid, alumina, magnetite and/or chromium oxide. In performing processes under high pressure or vacuum, the components of the apparatus are accordingly dimensioned and sealed.

The invention may be advantageously utilized particularly in the following chemical and/or physical processes:

(a) purification of waste gases: removal of substances such as HF, $SO_2$, $NO_x$, HCl, $H_2SO_4$ from waste gases in metallurgical and chemical plants by means of base (alkaline) materials such as CaO, $Ca(OH)_2$ or NaOH;

(b) recovery of iron: direct reduction of iron ores particularly with CO and/or $H_2$ as the reducing gas;

(c) drying of gases: adsorption of gaseous solvent residues or water by active carbon or molecular sieves;

(d) thermochemical processes: burning and calcinating, for example in the lime and cement manufacture, as well as gasification of coal accompanied by a desulfurization, for example, by means of adding lime.

BRIEF DESCRIPTION OF THE DRAWING

The sole FIGURE is a schematic elevational view of a preferred embodiment of the invention.

DESCRIPTION OF THE PREFERRED EMBODIMENT

Turning now to the FIGURE, a dust cloud is admitted through a conduit 12 to the reaction zone which is formed of a reaction tube 2 and a funnel-shaped reaction chamber 3. The components 2 and 3 are connected with one another by means of a conduit 13. The selected chemical and/or physical treatment of the dust cloud, to be performed in accordance with the method provided by the invention, occurs in the reaction zone. It is, for example, feasible to admit heat to the reaction tube 2 or remove heat therefrom. By raising or lowering an immersion tube 10 associated with the reaction chamber 3, the dwelling time and the solid particle concentration of the dust cloud may be altered in the reaction chamber 3. From the reaction zone the dust cloud is introduced into a separator 4 through a conduit 14 which may serve as an extended reaction zone. The separator 4 is formed of one or a plurality of cyclones. In the separator 4, the dust cloud is separated into its gaseous and solid components. The duration of separation and the degree of separation may be, within certain limits, changed by varying the height of an immersion tube 11 associated with the separator 4. Solid particles may be removed from the separated 4 through a conduit 26. If required, the gas which is in large measure free from solid particles, is introduced through a conduit 15 into a filter 6 where a further quantitative separation of the still-present solid particles may take place. Thereafter, the gas is discharged outwardly through a conduit 16 or is, in its entirety or in part reintroduced into a circular flow through a conduit 17. Fresh gas may be introduced through a conduit 18 into the conduit 17 in accordance with requirements. The gas is compressed in a compressor 19 and is admitted through a conduit 20 into a drive nozzle 9 which is arranged in the lower part of a vessel 5. The gas emanating from the drive nozzle 9 entrains the solid particles present in the vessel 5 as a solids column 22 and thus a dust cloud is generated which flows into the reaction zone through the conduit 12. In the vicinity of the driving nozzle 9 there are arranged loosening (slackening) nozzles 7 through which a weak gas stream 21 is introduced into the vessel 5 for loosening the solid particles in the vicinity of the driving nozzle 9 thus bringing them into a flow-ready state.

The height of the solids column 22 formed on the vessel 5 may be varied by adjusting the height of an immersion tube 8 extending from above into the vessel 5. The fresh solid particles stored in a storage container 1 are introduced into the vessel 5 through a conduit 23 and the immersion tube 8. The height of the solids column 22 is so set that the required flow resistance and the desired solid concentration in the dust cloud are achieved. The solid particles reaching the filter 6 may be removed from the treatment area through a conduit 27 or may be reintroduced into the vessel 5 through a conduit 24. The solid particles separated in the separator 4 are introduced into the vessel 5 in their entirety or in part by free fall through a gravity tube 25 and the immersion tube 8. Dashed line 28 indicates the connection in accordance with a further possibility relating to a recirculation of the solid particles. The conduit 27 may feed into the conduit 28.

In the description which follows the utilization of the apparatus and the method according to the invention will be set forth in more detail in connection with a defluorination process.

A waste gas containing approximately 100 mg HF per $Nm^3$ (normalized) and having a throughput of 3000 $Nm^3/h$ is introduced into the apparatus at a temperature of approximately 80° C. through the driving nozzle 9. The storage container 1 contains soft burnt lime (CaO) having a grain size of approximately between $4\mu$ and 3 mm which is introduced into the vessel 5 through the immersion tube 8. In the vessel 5 the solids column 22 is set at a height of 700 mm by means of an appropriate height adjustment of the immersion tube 8. The reaction zone encompasses two funnel-shaped reaction chambers 3 as well as as a reaction tube 2 and has a total length of approximately 20 m. In case the reaction tube 2 has a diameter of approximately 200 mm, the pressure drop in the reaction zone is approximately 400 mm water column. The solid particles separated in the cyclone are introduced into the vessel 5 by means of the gravity tube 25. The degree of separation of the cyclone is set at 80%. The gas leaving the cyclone with the residual solid particles is introduced into the filter 6 through the conduit 15. The solid particles separated in the filter 6 (which is a hose-type filter) are divided into two flows (conduits 24 and 27) by means of a hose tube. One partial stream (conduit 24) is reintroduced into the treatment zone, whereas the other partial stream (conduit 27) is discharged in such a quantity that corresponds to the fresh lime quantity introduced into the treatment zone through the immersion tube 8. The introduced fresh lime quantity is so set that the maximum $CaF_2$ content does not exceed 30% in the circulating solid material. The solid material content is monitored by sampling and chemical analysis. The purified gas removed from the downstream side of the filter 6 contains not more than 0.7 mg F $Nm^3$.

It is to be understood that the above description of the present invention is susceptible to various modifications, changes and adaptations, and the same are intended to be comprehended within the meaning and range of equivalents of the appended claims.

What is claimed is:

1. In a method of performing a treatment of a dust cloud, including the successive steps of generating the dust cloud from a gas and from solid particles, passing the dust cloud through a reaction zone, separating the dust cloud into its gaseous and solid components in a separator and reintroducing at least one part of at least one separated component into the dust cloud; the improvement comprising the step of introducing, prior to the dust cloud generating step, the solid particles into a height-adjustable solids column which seals the separator from the gas used in the dust cloud generating step and which, dependent from its height, controls the concentration of solids in the dust cloud.

2. In a method of performing a treatment of a dust cloud, including the successive steps of passing the dust cloud through a reaction zone, separating the dust cloud into its gaseous and solid components in a separator and reintroducing at least one part of at least one separated component into the dust cloud; the improvement comprising the steps of
   (a) forming a solids column constituted by the solid particles;
   (b) prior to passing the dust cloud through the reaction zone, generating the dust cloud by entraining solid particles from the solids column by the gas; and
   (c) varying the height of said solids column for controlling the concentration of the solid particles in the dust cloud.

3. A method as defined in claim 2, further comprising the steps of reintroducing separated solid particles from the seperator into the solids column and sealing the separator by said solids column from the gas utilized in the dust cloud generating step.

4. A method as defined in claim 2, wherein the dust cloud generating step includes the step of introducing the gas into the solids column.

5. A method as defined in claim 3, wherein said step of reintroducing separated solid particles is repeated until said treatment is terminated.

6. In an apparatus for performing a treatment of a dust cloud formed of a gas and solid particles, including means defining a reaction zone in which the treatment takes place; a separator connected to the means defining a reaction zone for receiving the dust cloud subsequent to the treatment and for separating the dust cloud into its gaseous and solid components; the improvement comprising
   (a) a vessel in which a solids column constituted by solid particles is formed; said vessel having an upper part and a lower part;
   (b) conduit means connecting said lower part of said vessel with said means defining said reaction zone for introducing the dust cloud from said vessel into said reaction zone;
   (c) an immersion tube extending into said vessel from said upper part for introducing solid particles into the vessel for feeding the solids column therein; said immersion tube being vertically adjustable for varying the height level of the solids column; and
   (d) a drive nozzle means arranged in said lower part of said vessel for introducing the gas thereinto for generating the dust cloud by entraining solid particles from the solids column and for introducing the dust cloud into said conduit means.

7. An apparatus as defined in claim 6, further comprising storage means accommodating solid particles and connected to said immersion tube for supplying solid particles thereto.

8. An apparatus as defined in claim 6, further comprising means connecting said separator with said immersion tube for reintroducing into said vessel solid particles separated in said separator.

9. An apparatus as defined in claim 6, further comprising means connecting said separator with said drive nozzle for reintroducing into said vessel gas separated in said separator.

10. An apparatus as defined in claim 6, wherein at least some components of the apparatus include a fire-resistant cladding.

11. An apparatus as defined in claim 6, wherein there are provided a plurality of drive nozzles arranged in said lower part of said vessel for introducing the gas thereinto for generating the dust cloud; and wherein there are further provided a plurality of reaction tubes each associated with a separate one of said drive nozzles by means of separate recirculating means.

12. An apparatus as defined in claim 6, wherein said separator comprises at least one cyclone.

13. An apparatus as defined in claim 12, wherein each cyclone has a vertically adjustable immersion tube.

14. An apparatus as defined in claim 6, further comprising loosening means arranged in said vessel in the vicinity of said drive nozzle for slackening the solid particles in the solids column.

15. An apparatus as defined in claim 14, wherein said loosening means comprises at least one loosening nozzle for introducing gas into said vessel.

16. An apparatus as defined in claim 6, wherein said means defining a reaction zone comprises a reaction tube.

17. An apparatus as defined in claim 16, wherein said means defining a reaction zone further comprises at least one reaction chamber and means connecting said reaction chamber between said reaction tube and said separator.

18. An apparatus as defined in claim 17, wherein said reaction chamber is funnel-shaped defining a wide upper end connected to said separator and a narrow lower end connected to said reaction tube.

19. An apparatus as defined in claim 18, further comprising a vertically adjustable additional immersion tube forming part of the means connecting said reaction chamber with the separator; said additional immersion tube extending from said wide end into said reaction chamber.

* * * * *